(12) United States Patent
Kudo

(10) Patent No.: US 11,279,401 B2
(45) Date of Patent: Mar. 22, 2022

(54) VEHICLE CONTROL SYSTEM

(71) Applicant: Toyota Jidosha Kabushiki Kaisha, Toyota (JP)

(72) Inventor: Yoshio Kudo, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 16/808,820

(22) Filed: Mar. 4, 2020

(65) Prior Publication Data

US 2020/0283062 A1 Sep. 10, 2020

(30) Foreign Application Priority Data

Mar. 7, 2019 (JP) .............................. JP2019-041790

(51) Int. Cl.
*B62D 6/00* (2006.01)
*B62D 5/00* (2006.01)

(52) U.S. Cl.
CPC .............. *B62D 6/008* (2013.01); *B62D 5/006* (2013.01)

(58) Field of Classification Search
CPC ........ B62D 6/008; B62D 5/006; B62D 6/007; B62D 5/0472; B62D 5/04; B62D 3/12; B62D 15/0205; B62D 15/021; B62D 6/001; B62D 6/00
USPC .......................................................... 701/41
See application file for complete search history.

(56) References Cited

U.S. PATENT DOCUMENTS

| | | | | |
|---|---|---|---|---|
| 6,751,539 | B2* | 6/2004 | Uenuma ................ | B62D 6/008 180/402 |
| 2006/0037806 | A1* | 2/2006 | Kasahara ............... | B62D 6/008 180/402 |
| 2017/0247048 | A1* | 8/2017 | Namikawa ............... | B62D 3/12 |
| 2018/0148088 | A1* | 5/2018 | Katayama .............. | B62D 5/003 |
| 2019/0233005 | A1* | 8/2019 | Maeda ..................... | B62D 6/04 |

FOREIGN PATENT DOCUMENTS

| | | |
|---|---|---|
| EP | 1600359 A2 | 11/2005 |
| JP | 2000-108914 A | 4/2000 |
| JP | 2017-149359 A | 8/2017 |
| JP | 2018-094966 A | 6/2018 |
| JP | 2018-184129 A | 11/2018 |

* cited by examiner

*Primary Examiner* — Shardul D Patel
(74) *Attorney, Agent, or Firm* — Dinsmore & Shohl LLP

(57) ABSTRACT

The steer-by-wire system includes a steering device, a reaction force device, and a controller. The steering device turns wheels of a vehicle. The reaction force device applies a steering reaction force to a steering wheel. The controller is configured to control the steering reaction force by drive control of the reaction force device in response to an operation of the steering wheel. The controller is further configured to: obtain a signal including a component due to a reaction force which acts on the wheels from a road surface; extract a signal being greater than or equal to a predetermined frequency from the signal including the component due to the reaction force; and calculate a control amount of the reaction force device based on the extracted signal equal to or greater than the predetermined frequency.

5 Claims, 8 Drawing Sheets

VEHICLE CONTROL SYSTEM

CROSS-REFERENCE TO RELATED APPLICATION

The present application claims priority under 35 U.S.C. § 119 to Japanese Patent Application No. 2019-041790, filed Mar. 7, 2019. The contents of this application are incorporated herein by reference in their entirety.

FIELD

The present disclosure relates to a vehicle control system comprising a so-called SBW (Steer-By-Wire) type steering system.

BACKGROUND

JP2000-108914A discloses a SBW system in which a steering device and a steering wheel are mechanically separated. The conventional SBW system includes a steering motor, a reaction force motor and a controller. The steering motor turns wheels of a vehicle. The reaction force motor applies a steering reaction force to a steering wheel. The controller calculates control amount of these motors.

SUMMARY

During the traveling of the vehicle, the wheels are vibrated due to a reaction force acting on the wheels from a road surface (hereinafter also referred to as a "ground reaction force"). In a system where the wheels and the steering wheel are mechanically connected, this vibration is transmitted to the steering wheel. On the other hand, in the SBW system, such a vibration is basically cut off. Therefore, it is difficult for a driver of the vehicle to obtain a reasonable steering feeling (a response feeling) for the ground reaction force. This is one of the factors leading to a decrease in steering performance.

If the control amount of the reaction force motor is calculated in consideration of the vibration component included in the ground reaction force, the driver may be given an appropriate steering feeling. However, if any vibration component contained in the ground reaction force is taken into consideration, it is transmitted to the steering wheel to the vibration that does not need to be transmitted. Therefore, the steering performance may be lowered or the driver may be anxious by the unnecessary vibration component.

It is an object of the present disclosure to provide a technique capable of giving the driver the reasonable steering feeling for the ground reaction force in the vehicle to which the SBW system is applied.

A first aspect of the present disclosure is a vehicle control system.

The vehicle control system comprises a steer-by-wire system.

The steer-by-wire system includes a steering device, a reaction force device, and a controller.

The steering device turns wheels of a vehicle.

The reaction force device is mechanically separated from the steering device. The reaction force device applies a steering reaction force to a steering wheel.

The controller is configured to control the steering reaction force by drive control of the reaction force device in response to an operation of the steering wheel.

The controller is configured to:
obtain a signal including a component due to a reaction force which acts on the wheels from a road surface;
extract a signal being greater than or equal to a predetermined frequency from the signal including the component due to the reaction force; and
calculate a control amount of the reaction force device based on the extracted signal equal to or greater than the predetermined frequency.

A second aspect of the present disclosure further has the following features in first aspect.

The signal equal to or greater than the predetermined frequency includes a first signal and a second signal.

The first signal belongs to a first frequency band.

The second signal belongs to a second frequency band corresponding to a remaining frequency band rather than the first frequency band.

The controller is further configured to:
determine whether or not a predetermined condition is established; and
if it is determined that the predetermined condition is established, weaken the first signal in the calculation processing of the control amount.

A third aspect of the present disclosure further has the following features in the second aspect.

The predetermined condition is that the vehicle is in a braking state.

The first frequency band is a frequency band of a low-frequency vibration which is generated during braking of the vehicle.

A fourth aspect of the present disclosure further has the following features in the second aspect.

The predetermined condition is that the vehicle is traveling in a predetermined speed range.

The first frequency band is a frequency band of a low-frequency vibration which is generated by flutter.

A fifth aspect of the present disclosure further has the following features in the first aspect.

The vehicle is configured to run on a first or a second travel mode.

The controller is further configured to calculate the control amount such that a vibration of the steering wheel is greater during a travel with the first travel mode than the travel with the second travel mode.

A sixth aspect of the present disclosure further has the following feature in the first aspect.

The signal equal to or greater than the predetermined frequency includes a signal due to bumps and dips on roads.

According to the first aspect, the signal equal to or greater than the predetermined frequency is extracted from the signal including the component due to the ground reaction force. Therefore, by setting the predetermined frequency appropriately, it is possible to remove the signal due to the vibration that does not need to be transmitted to the steering wheel or leave the signal due to the vibration that need to be transmitted to the steering. And by calculating the control amount of the reaction force device based on the extracted signal equal to or larger than the predetermined frequency, it is possible to give the driver an appropriate steering feeling for the ground reaction force.

According to the second aspect, when the predetermined condition is established, processing is executed to weaken the first signal in the calculation processing of the control amount. Since the first signal belongs to the first frequency band, by setting the predetermined frequency appropriately, contribution of the first signal to the signal equal or larger than the predetermined frequency is reduced. Therefore, it is possible to suppress the transmission of the vibration that does not need to be transmitted to the steering wheel.

According to the third aspect, it is possible to suppress the vibration generated during the braking of the vehicle from being transmitted to the steering wheel.

According to the fourth aspect, it is possible to suppress the vibration generated by the flutter from being transmitted to the steering wheel.

According to the fifth aspect, the control amount of the reaction force device is calculated such that the vibration of the steering wheel is greater during the travel with the first travel mode than the travel with the second travel mode. Therefore, by setting the first and second travel mode appropriately, it becomes easy to transmit the vibration to be transmitted to the steering wheel while the vehicle is traveling in the first travel mode, whereas it becomes difficult to transmit the vibration to the steering wheel while the vehicle is traveling in the second travel mode.

According to the sixth aspect, the vibration generated by the bumps and dips on the road can be transmitted to the steering wheel thereby it is possible to give the driver an appropriate steering feeling for the ground reaction force.

DESCRIPTION OF EMBODIMENTS

Embodiments of the present disclosure are described hereunder with reference to the accompanying drawings. However, it is to be understood that even when the number, quantity, amount, range or other numerical attribute of an element is mentioned in the following description of the embodiments, the present disclosure is not limited to the mentioned numerical attribute unless it is expressly stated or theoretically defined. Further, structures or steps or the like described in conjunction with the following embodiments are not necessary to embodiments of the present disclosure unless expressly stated or theoretically defined.

1. First Embodiment

First, a first embodiment will be described with reference to FIGS. 1 to 5.

1.1 SBW System

Figure 1:
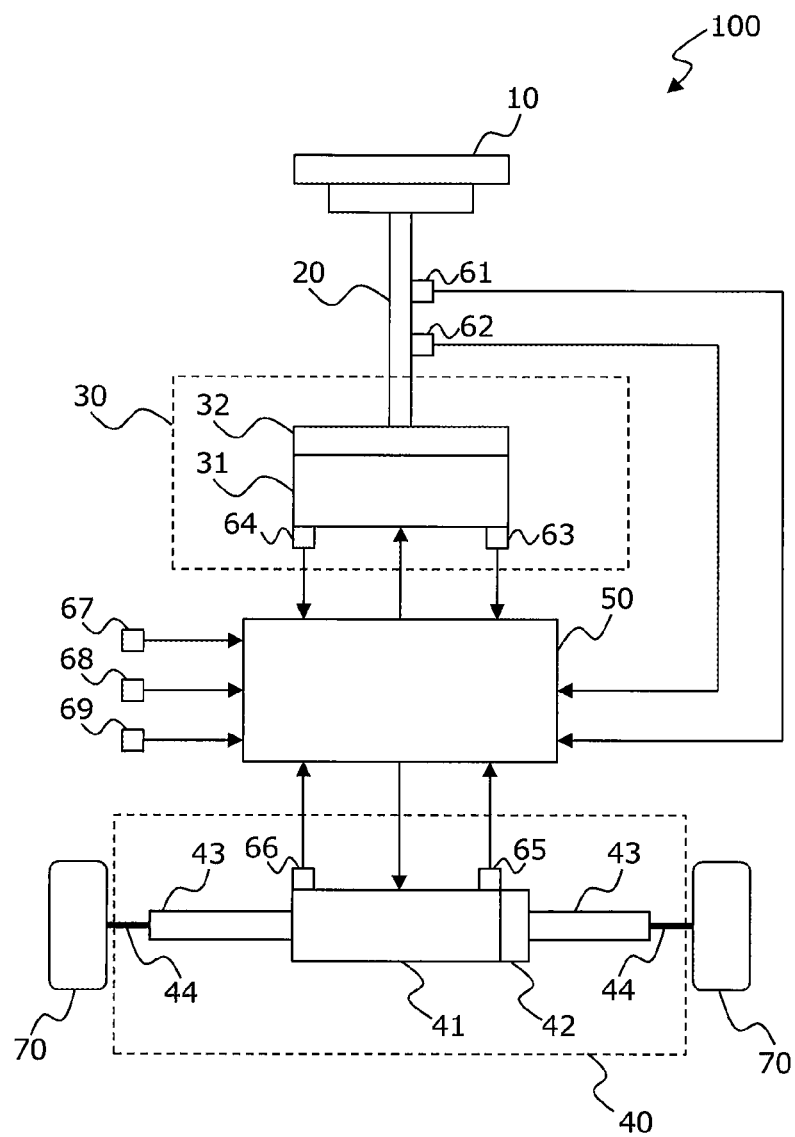
FIG. 1 is a diagram showing a schematic configuration example of a SBW system.

A vehicle control system according to the first embodiment is mounted on a vehicle. The vehicle control system includes a SBW system as a steering system. FIG. 1 is a diagram showing a schematic configuration example of the SBW system. The SBW system 100 shown in FIG. 1 includes a steering wheel 10, a steering shaft 20, a reaction force device 30, a steering device 40, a controller 50 and sensors 61 to 69.

The steering wheel 10 is an operating member used for steering by a driver of the vehicle. The steering shaft 20 is coupled to the steering wheel 10 and rotates with the steering wheel 10.

The reaction force device 30 applies a steering reaction force to the steering wheel 10. The steering reaction force is a force (torque) that acts in a direction opposed to a direction of the steering wheel 10 operated by the driver. The reaction force device 30 includes a reaction force motor 31 (reaction force actuator) and a deceleration mechanism 32.

The reaction force motor 31 is a source of the steering reaction force. As the reaction force motor 31, a three-phase (U, V, W) brushless motor is exemplified. The rotor of the reaction force motor 31 is connected to the steering shaft 20 via the deceleration mechanism 32. Torque of the reaction force motor 31 is applied as a steering reaction force to the steering shaft 12 and thus to the steering wheel 10. Drive of the reaction force device 30 is controlled by the controller 50.

The steering device 40 generates power (steering force) for turning left and right wheels 70. The steering device 40 includes a steering motor (steering actuator) 41, a deceleration mechanism 42, a rack bar 43 and a tie rod 44.

The steering motor 41 is a source of a steering force. As the steering motor 41, a three-phase (U, V, W) brushless motor is exemplified. A rotor of the steering motor 41 is connected to the rack bar 43 via the deceleration mechanism 42. The rack bar 43 is coupled to the wheels 70 via the tie rod 44. The torque of the steering motor 41 is applied to the rack bar 43 as a steering force. When the steering motor 41 rotates, its rotational motion is converted to a linear motion of the rack bar 43, thereby the wheels 70 are turned. The drive of the steering motor 41 is controlled by the controller 50.

The reaction force device 30 and the steering device 40 are mechanically separated from each other.

The steering angle sensor 61 is provided on the steering shaft 20. The steering angle sensor 61 detects steering angle δ of the steering wheel 10. The steering angle sensor 61 transmits a detecting signal of the steering angle δ to the controller 50.

The torque sensor 62 is provided in a portion of the steering shaft 20 closer to the steering wheel 10 than the deceleration mechanism 32. The torque sensor 62 detects steering torque T applied to the steering shaft 20. The torque sensor 62 transmits the detected signal of the steering torque T to the controller 50.

The rotational angle 63 is provided on the reaction force motor 31. The rotational angle 63 detects rotational angle θs of the reaction force motor 31. The rotational angle 63 transmits the detected signal of the rotational angle θs to the controller 50.

The current sensor 64 is provided on the reaction force motor 31. The current sensor 64 detects a current (hereinafter also referred to as a "reaction current") Ims that flows through the reaction force motor 31. The current sensor 64 transmits the detected signal of the reaction current Ims to the controller 50.

The rotational angle 65 is provided on the steering motor 41. The rotational angle 65 detects rotational angle θw of the steering motor 41. The rotational angle 65 transmits the detected signal of the rotational angle θw to the controller 50.

The current sensor 66 is provided on the steering motor 41. The current sensor 66 detects a current (hereinafter also referred to as a "steering current") Imw that flows through the steering motor 41. The current sensor 66 transmits the detected signal SImw of the steering current Imw to the controller 50.

The speed sensor 67 detects vehicle speed V, which is speed of the vehicle. The speed sensor 67 transmits the detected signal SV of the vehicle speed V to the controller 50. Alternatively, a wheel speed sensor may be used instead of the speed sensor 67, and the vehicle speed V may be calculated based on the detected signal of rotational speed of the wheels 70.

The yaw rate sensor 68 detects yaw rate y of the vehicle. The yaw rate sensor 68 transmits the detection signal of the yaw rate y to the controller 50.

The lateral acceleration sensor 69 detects lateral accelerations Gy which acts on the vehicle. The lateral acceleration sensor 69 transmits the detected signal of the lateral acceleration Gy to the controller 50.

The controller 50 controls the SBW system 100. The controller 50 includes a microcomputer including a processor, a memory, an input interface and an output interface. The microcomputer is also referred to as an ECU (Electronic Control Unit).

The controller 50 executes steering control in which drive of the steering motor 41 is controlled in accordance with manipulation of the steering wheel 10. The steering control is executed, for example, as follows. First, the target steering angle θw* is calculated based on actual steering angle S or actual rotational angle θs. The actual steering angle δ is calculated based on the detection signal of the steering angle δ. The actual rotation angle θs is calculated based on the detection signal of the rotation angle θs. The target steering angle θw* is a target value of the rotational angle θw.

Subsequently, the target steering current Imw* is calculated based on a difference between the actual rotational angle θw and the target steering angle θw*. Target steering current Imw* is a current command value for the steering motor 41. The steering current Imw is controlled such that the actual steering current Imw coincides with this target steering current Imw*.

The controller 50 also executes reaction force control in which the drive of the reaction force motor 31 is controlled in accordance with the manipulation of the steering wheel 10. The reaction force control is executed, for example, as follows. First, a target reaction current Ims* is calculated based on the signal SImw. The target reaction current Ims* is a current command value for the reaction force motor 31. Then, the reaction current Ims is controlled based on the target reaction current Ims*. Hereinafter, calculation processing of the target reaction current Ims* will be described.

1.2 Calculation Processing of Target Reaction Current

First, the reason why the target reaction current Ims* is calculated based on the signal SImw will be described. The ground reaction force which acts on the wheels 70 vibrates the wheels 70. The vibration of the wheels 70 also vibrates the steering device 40. However, this vibration is shut off in the SBW system 100 where the steering device 40 is mechanically separated from the reaction force device 30. If the target reaction current Ims* is calculated based on the actual vehicle speed V and the actual steering angle δ, it is possible to not transmit the vibration due to the ground reaction force to the driver intentionally.

However, in view of an aspect of providing steering feeling to the driver, it is not always desirable to shut off all of the vibration due to the ground reaction force. In this regard, in the steering control described above, the steering current Imw is controlled based on the target steering current Imw*, and the target steering current Imw* is calculated based on the rotational angle θw which varies depending on the bumps and dips on the roads. That is, the signal SImw includes a signal due to the bumps and dips. Therefore, the vibration due to the ground reaction force can be transmitted to the driver by calculating the target reaction current Ims* based on the signal SImw.

However, the signal SImw also includes a signal other than the signal due to the bumps and dips. Therefore, if the target reaction current Ims* is calculated using the signal SImw as it is, the signal is transmitted to the driver up to an unnecessary vibration. Therefore, the first embodiment executes processing to exclude an unnecessary signal from the signal SImw during the calculation processing of target reaction current Ims*.

1.2.1 First Configuration Example

Figure 2:
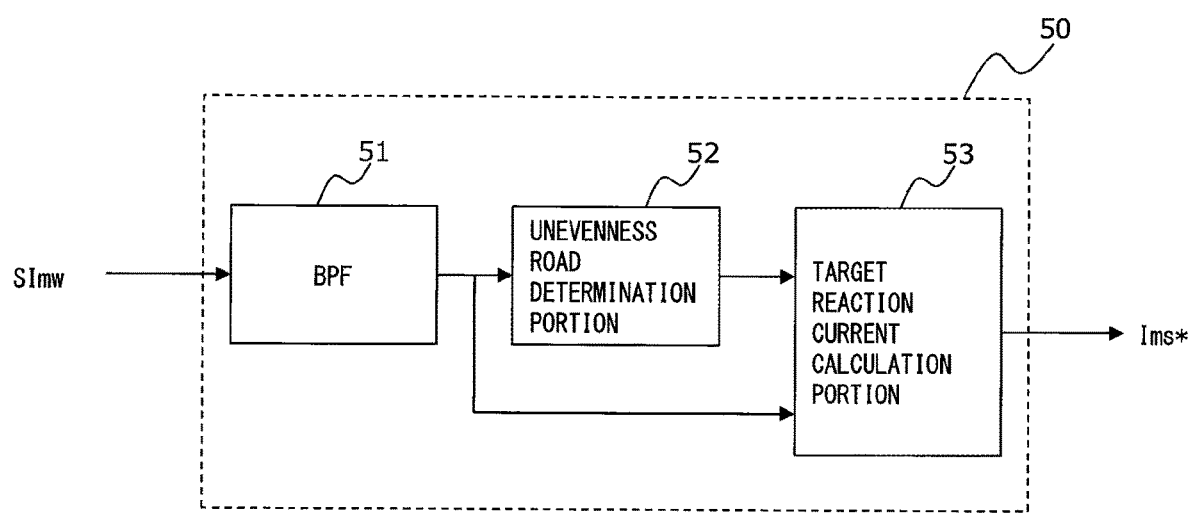
FIG. 2 is a diagram showing a first configuration example of a controller to execute calculation processing of a target reaction current in a first embodiment.

FIG. 2 is a diagram showing a first configuration example of the controller 50 to execute the calculation processing of the target reaction current Ims* in the first embodiment. As shown in FIG. 2, the controller 50 includes a BPF (Band-Pass Filter) 51, an unevenness road determination portion 52, and a target reaction current calculation portion 53.

The BPF51 extracts a signal greater than or equal to a predetermined frequency from the signal SImw. This predetermined frequency is set in advance as an upper limit of the frequency band of a low-frequency vibration FB-r generated by a rut or the like formed on the road surface. Therefore, after passing the BPF51, a low-frequency signal due to rut or the like is removed from the signal SImw.

Figure 3:
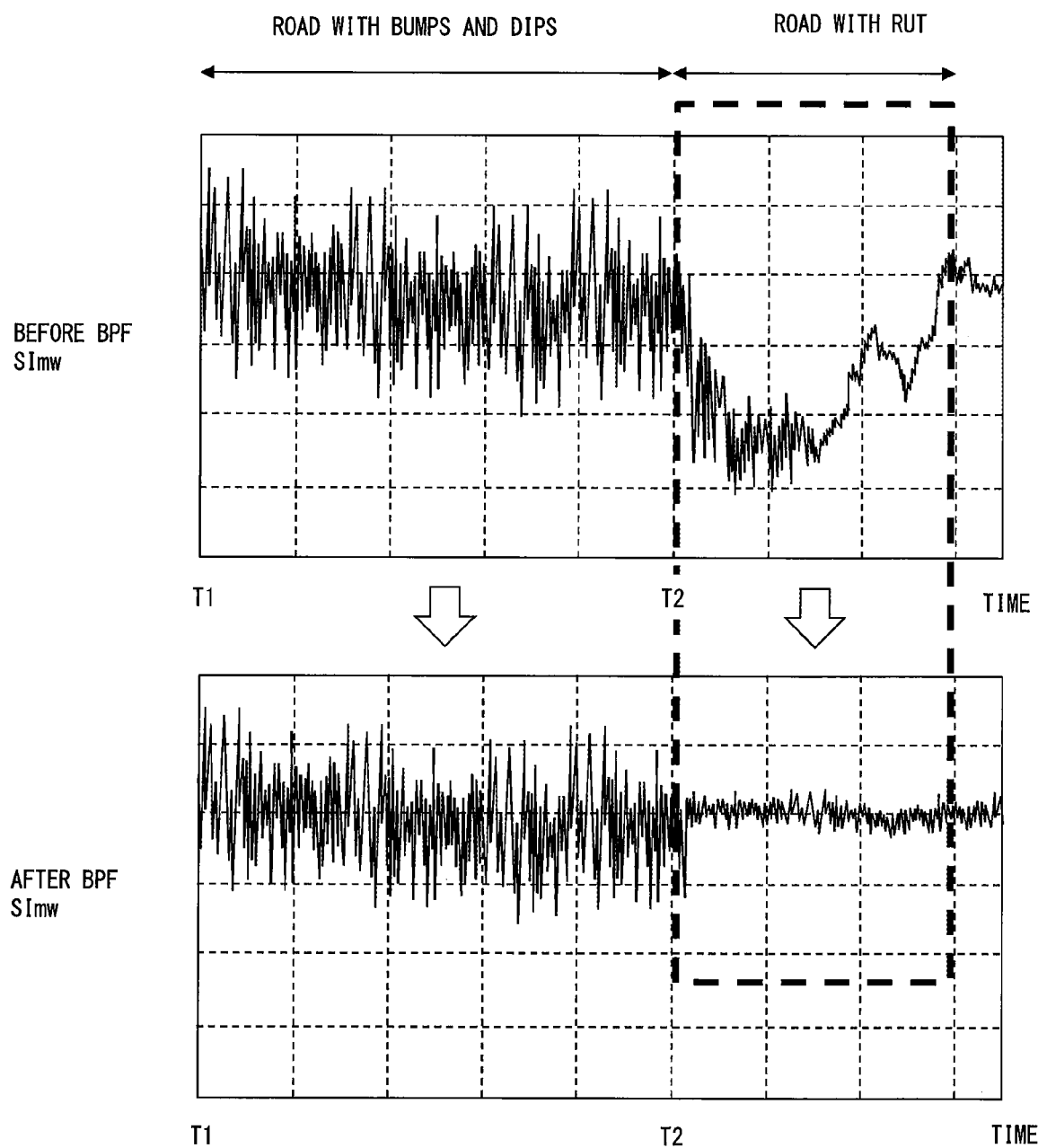
FIG. 3 is a diagram for explaining a difference between detected signal of a steering current with BPF processing and that without BPF processing.

FIG. 3 is a diagram for explaining a difference between the signal SImw with the BPF processing and the signal without the BPF processing. The upper part of FIG. 3 represents the signal SImw before to execute the BPF processing. As shown in the upper part, between time T1 and time T2, the signal SImw vibrates around a certain current value (e.g., 0 mV). This is because the signal due to the bumps and dips is included in the signal SImw. The vibration property of the signal SImw changes at the time T2. For example, a center position and an amplitude of the signal SImw after the time T2 is changed as compared to those before the time T2. This is because that the low-frequency signal due to the rut or the like is further added to the signal SImw after the time T2.

The lower part of FIG. 3 shows the signal SImw after the BPF processing. The data of the signal SImw shown in the lower part is the same as that in the upper part. As shown in the lower part, when the BPF processing is executed, the amplitude of the signal SImw becomes small after the time T2. This is because the low-frequency signal due to the rut or the like is removed from the signal SImw.

Figure 4:
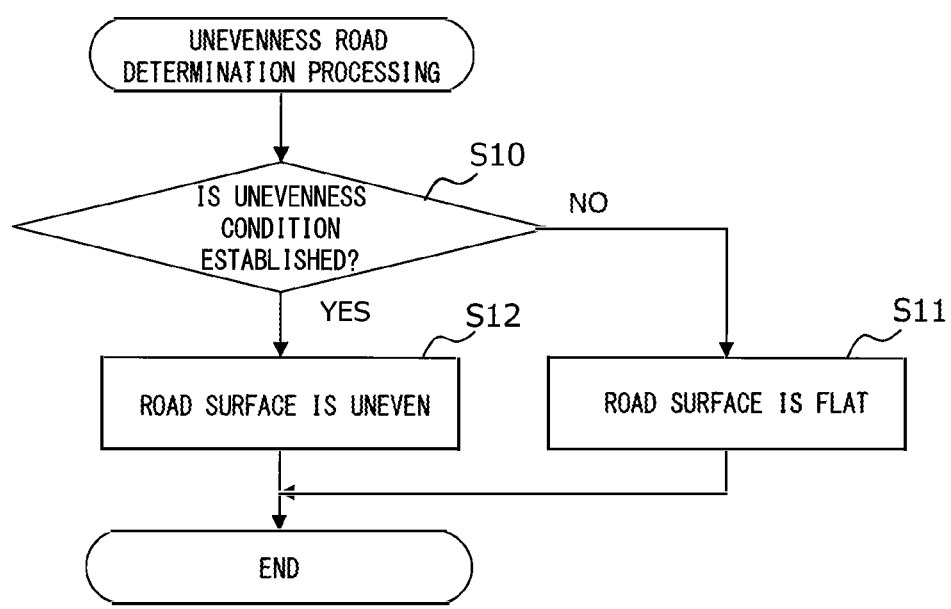
FIG. 4 is a flow chart for explaining a flow of unevenness road determination processing.

The unevenness road determination portion 52 executes unevenness road determination processing on the signal SImw (hereinafter also referred to as a "signal SImw_51") that has passed through the BPF51. FIG. 4 is a flow chart for explaining a flow of the unevenness road determination processing. In the routine shown in FIG. 4, first, it is determined whether or not an unevenness condition is established (step S10). In the determination processing of the step S10, for example, the signal SImw_51 and a threshold TH1 are compared for a predetermined period. Then, if the number of times where the signal SImw_51 exceeds the threshold TH1 is equal to or greater than a threshold TH2, it is determined that the unevenness condition is established.

In the determination processing of the S10, the signal SImw_51 may be compared with a dead band. In this instance, if the signal SImw_51 exceeds the dead band, it is determined that the unevenness condition is established.

If the determination result in the step S10 is negative, it is determined that the road surface is flat (step S11). Otherwise, it is determined that the road surface is uneven (step S12).

The target reaction current calculation portion 53 calculates the target reaction current Ims* based on the result of the unevenness road determination processing and the signal SImw_51. If it is determined that the road surface is flat, the target reaction current calculation portion 53 calculates the target reaction current Ims* by multiplying the signal SImw_51 by a gain G1. If it is determined that the road surface includes the bumps and dips, the target reaction current calculation portion 53 calculates the target reaction current Ims* by multiplying the signal SImw_51 by a gain G2. The gain G2 may be the same value as the gain G1, or may be a different value.

If it is determined that the road surface includes the bumps and dips, the target reaction current calculation portion 53 may calculate the target reaction current Ims* by adding a specific frequency band component to the signal SImw_51. This specific frequency band is preset as a frequency band of low-frequency vibration FB-a generated by bumps and dips on the roads (asperity).

In the first configuration example, the target reaction current Ims* may be calculated based on an output signal from an axial force sensor. The axial force sensor is provided on the rack bar 43. The axial force sensor detects an axial force which acts in an axial direction of the rack bar 43. This axial force varies with bumps and dips on the roads. Therefore, the output signal from the axial force sensor includes a signal due to the bumps and dips. However, as in the case of the signal SImw, the output signal from the axial force sensor includes the signal other than the signal due to the bumps and dips. Therefore, the target reaction current Ims* can be calculated by processing the output signal from the axial force sensor with the same method as that described in FIG. 2.

The calculated target reaction current Ims* is given to the reaction force motor 31 as a control amount of the reaction force motor 31.

1.2.2 Second Configuration Example

Figure 5:
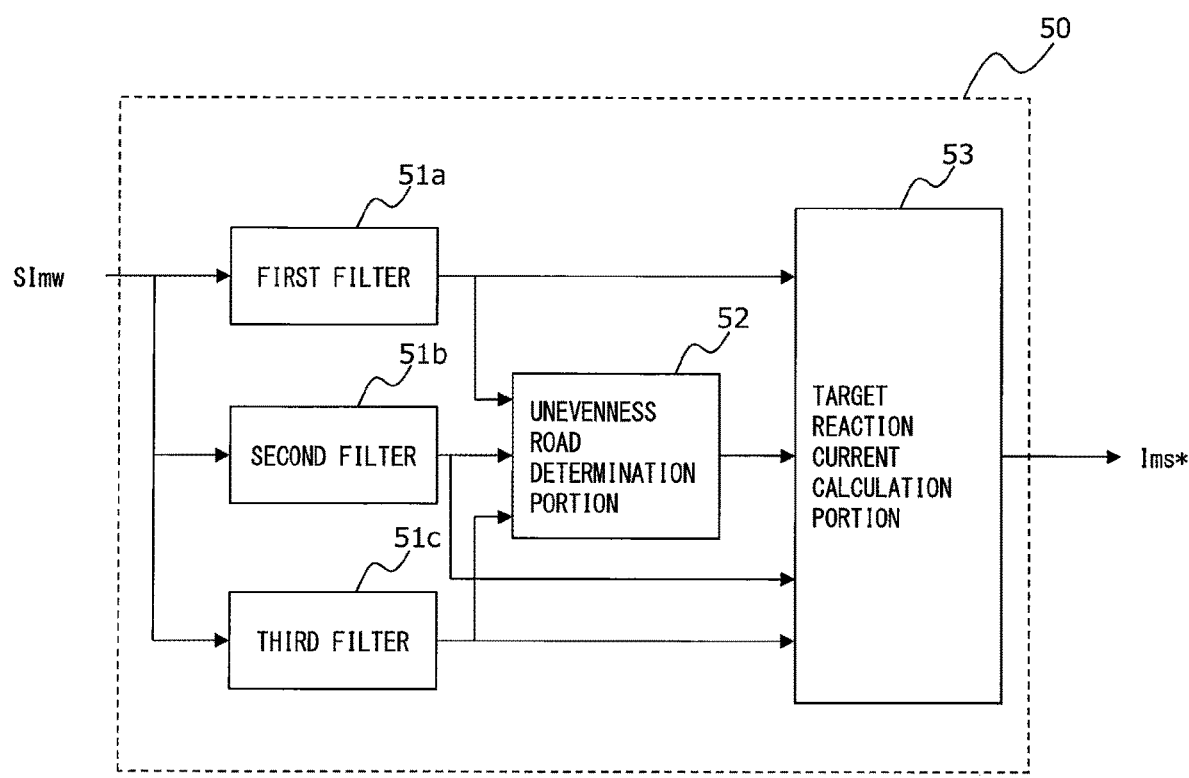
FIG. 5 is a diagram showing a second configuration example of the controller to execute the calculation processing of the target reaction current in the first embodiment.

FIG. 5 is a diagram showing an second configuration example of a controller 50 to execute the calculation processing of the target reaction current Ims* in the first embodiment. As shown in FIG. 5, the controller 50 includes a first filter 51a, second filter 51b, a third filter 51c, the unevenness road determination portion 52, and the target reaction current calculation portion 53.

In the first configuration example described above, the BPF51 was included. On the other hand, in the second configuration example, the first filter 51a, second filter 51b and third filter 51c are included which is set by subdividing the BPF51. For example, the first filter 51a is set to occupy a low-frequency band of the frequency band FB_51 extracted by the BPF51. The third filter 51c is set to occupy a high-frequency band of the frequency band FB_51, and the second filter 51b is set to occupy a middle-frequency band of the frequency band FB_51. The number of filters for subdividing the frequency band FB_51 may be two, or four or more.

The unevenness road determination portion 52 executes the unevenness road determination processing on the signal SImw that has passed through the first filter 51a (hereinafter also referred to as "signal SImw_51a"). The unevenness road determination portion 52 also executes unevenness road determination processing on the signal SImw which has passed through the second filter 51b (hereinafter also referred to as a "signal SImw_51b") and the signal SImw which has passed through the third filter 51c (hereinafter also referred to as a "signal SImw_51c"). The content of the unevenness road determination processing is the same as that in the first configuration example.

The target reaction current calculation portion 53 calculates the target reaction current Ims* based on the signals SImw_51a to SImw_51c and the result of the unevenness road determination processing. For example, if it is determined that the road surface is flat as the result of the unevenness road determination processing on the signal SImw_51a, the target reaction current calculation portion 53 multiplies the signal SImw_51a by the gain G31. If it is determined that the road surface includes the bumps and dips, the target reaction current calculation portion 53 multiplies the signal SImw_51a by the gain G41. The gain G41 may be the same value as the gain G31, or may be a different value.

The multiplication processing of such the gains is also executed for the signals SImw_51b and SImw_51c. Gains G32 and G42 multiplied by the signal SImw_51b may be the same value or different values. Gains G33 and 043 multiplied by the signal SImw_51c may be the same value or different values. The gains G31 to G43 may be the same value or different values.

When the gains G31 to G33 are set to different values, or when the gains G41 to G43 are set to different values, it is desirable to increase the value of the gain as the occupancy frequency band of the filters increases. The vibration becomes harder to transmit as its frequency increases. Therefore, by setting the gain values in such the manner, the vibration generated by the bumps and dips can be easily transmitted to the driver.

The target reaction current calculation portion 53 synthesizes the signals SImw_51a to SImw_51c after the multiplication processing. In this way, the target reaction current Ims* is calculated.

In the second configuration example, the target reaction current Ims* may be calculated based on the output signal from the axial force sensor.

1.3 Effects

According to the first embodiment described above, the low-frequency signal due to rut or the like is removed from the signal SImw (or the output signal from the axial force sensor) in the calculation processing of the target reaction current Ims*. The signal SImw from which the low-frequency signal due to rut or the like has been removed is mainly composed of the signal due to the bumps and dips. Therefore, it is possible to transmit the vibration generated by the bumps and dips to the driver while suppressing the transmission of the low-frequency vibration due to rut or the like to the driver. Therefore, it is possible to give a reasonable steering feeling for the ground reaction force.

2. Second Embodiment

Next, a second embodiment will be described with reference to FIG. 6. In the following description, differences from the first embodiment will be mainly described, and descriptions overlapping with those in the first embodiment will be omitted as appropriate.

2.1 Calculation Processing of Target Reaction Current

Figure 6:
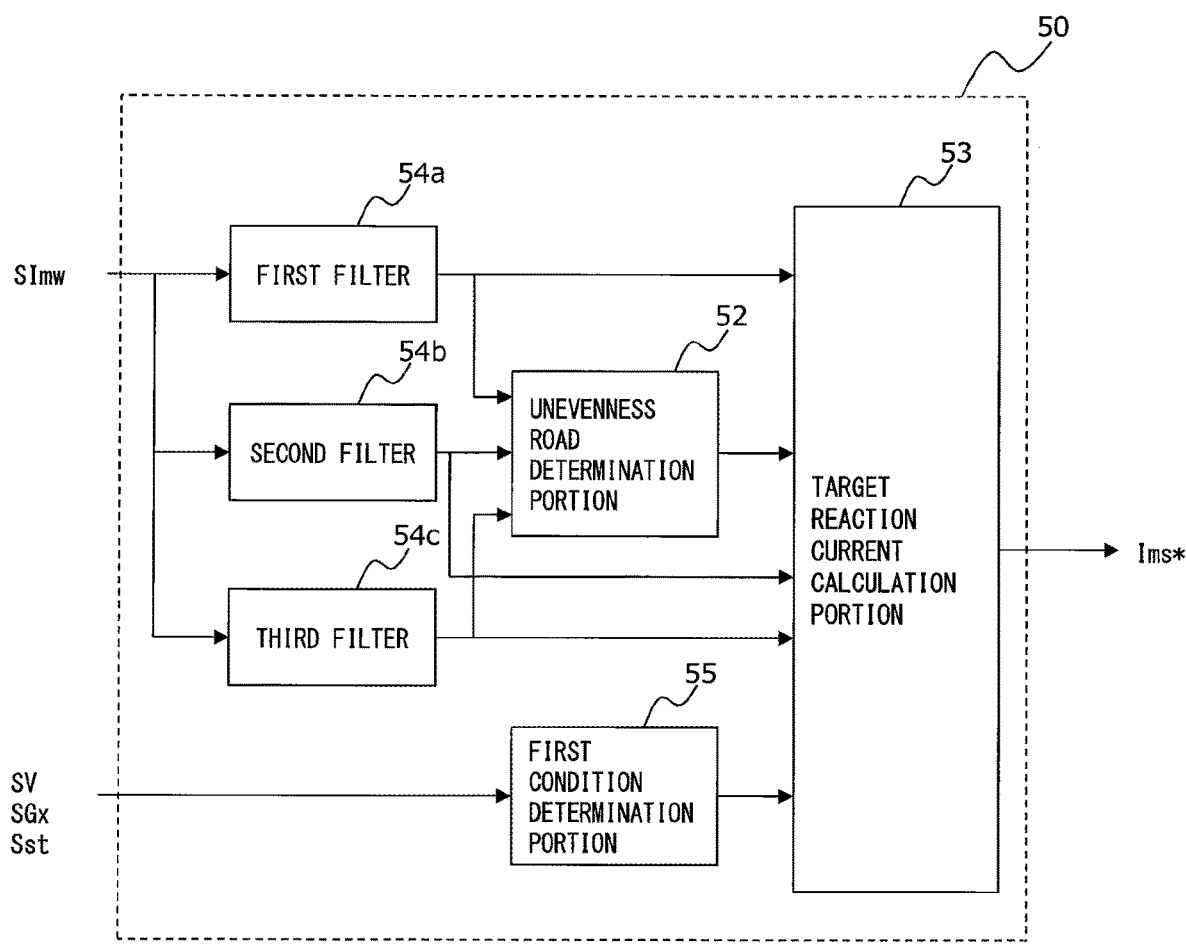
FIG. 6 is a diagram showing a configuration example of the controller to execute the calculation processing of the target reaction current in a second embodiment.

FIG. 6 is a diagram showing a configuration example of the controller 50 to execute the calculation processing of the target reaction current Ims* in the second embodiment. As shown in FIG. 6, the controller 50 includes a first filter 54a, second filter 54b, a third filter 54c, the unevenness road determination portion 52, the target reaction current calculation portion 53, and a first condition determination portion 55.

In the second configuration example of the first embodiment described above, the filters 51a to 51c are set by subdividing the extraction frequency band of the BPF51 (i.e., the frequency band FB_51). Like the second configuration example, in the second embodiment, the filters 54a to 54c are set by subdividing the frequency band FB_51. However, in the second embodiment, the occupancy frequency band of a specific filter within the filters 54a to 54c is set to a frequency band of a low-frequency FB_b that occurs during braking of the vehicle.

The vibration generated during the braking is classified as an extra vibration as in the low-frequency vibration due to the rut or the like. However, the frequency band FB-b exists inside the frequency band FB-a. Therefore, if the target reaction current Ims* is calculated based on the first or second configuration example of the first embodiment, unnecessary vibration is transmitted to the driver during the braking. In view of such problems, a specific filter is set in the second embodiment.

The function of the unevenness road determination portion 52 is basically the same as that in the second configuration example. That is, the unevenness road determination portion 52 executes the unevenness road determination processing on the signal SImw that has passed through the first filter 54a (hereinafter, also referred to as "signal SImw_54a). The unevenness road determination portion 52 also executes the unevenness road determination processing on the signal SImw which has passed through the second filter 54b (hereinafter also referred to as "signal SImw_54b") and the signal SImw which has passed through the third filter 54c (hereinafter also referred to as "signal SImw_54c"). The content of the unevenness road determination processing is the same as that in the first configuration example.

The first condition determination portion 55 determines whether or not a first condition is established. The first condition is established when the vehicle is in a braking state. The establishment of the first condition is determined based on, for example, the signal SV and signal SGx and Sst. The signal SGx is a signal of acceleration Gx in a longitudinal direction which is detected separately. The signal Sst is a signal detected by a lighting operation of brake lamps. The signal Sst may be detected by a stepping action of a brake pedal by the driver or a closing action of a master valve.

The target reaction current calculation portion 53 calculates the target reaction current Ims* based on the determination result of the first condition, the result of the unevenness road determination processing, and the signals SImw_54a to SImw_54c. For example, if it is determined that the first condition is not established and the road surface is flat, the target reaction current calculation portion 53 multiplies the signal SImw_54a by a gain G51. The multiplication processing of such the gain is also executed on the signals SImw_54b and SImw_54c.

Further, for example, if it is determined that the first condition is not established and the road surface includes the bumps and dips, the target reaction current calculation portion 53 multiplies the signal SImw_54a by a gain G61. The multiplication processing of such the gain is also executed on the signals SImw_54b and SImw_54c. The magnitude relationships of the gains G51 and G61, gains G52 and G62 which are multiplied by the signal SImw_54b, and gains G53 and G63 which are multiplied by the signal SImw_54c are the same as that of the gains G31 to G43.

Further, for example, if it is determined that the first condition is established, the target reaction current calculation portion 53 changes the gain to be multiplied by the signal SImw which has passed through the specific filter. Specifically, when the specific filter corresponds to the filter 54b, the target reaction current calculation portion 53 sets the gain to be multiplied by the signal SImw_54b to a value smaller than the gain G52 or G62. That is, if the first condition is established, the target reaction current calculation portion 53 executes processing to weaken the signal that has passed through the specific filter.

The target reaction current calculation portion 53 synthesizes the signals SImw_54a to SImw_54c after the multiplication processing. In this way, the target reaction current Ims* is calculated.

2.2 Effects

According to the second embodiment described above, the determination result of the first condition is additionally considered to the calculation processing of the target reaction current Ims*. Therefore, the signal due to the braking of the vehicle is removed from the signal SImw (or the output signal from the axial force sensor) during the braking of the vehicle. Therefore, it is possible to suppress the transmission of the vibration generated during the braking to the driver. Therefore, it is possible to improve the steering feeling during the braking.

2.3 Correspondence Relation

The correspondence relation between the second embodiment and the second aspect is as follows. That is, the frequency band FB-b corresponds to the "first frequency band" of the second aspect. The signal which has passed through the specific filter correspond to the "first signal" of the second aspect. The remaining frequency band of the frequency band FB_51 excluding the frequency band FB_b corresponds to the "second frequency band" of the second aspect. The signal passed through the filters other than the specific filter correspond to the "second signal" of the second aspect. The first condition corresponds to the "predetermined condition" of the second aspect.

3. Third Embodiment

Next, a third embodiment will be described with reference to FIG. 7. In the following description, differences from the first or second embodiment described above will be mainly described, and descriptions overlapping with those in the first or second embodiment will be omitted as appropriate.

3.1 Calculation Processing of Target Reaction Current

Figure 7:
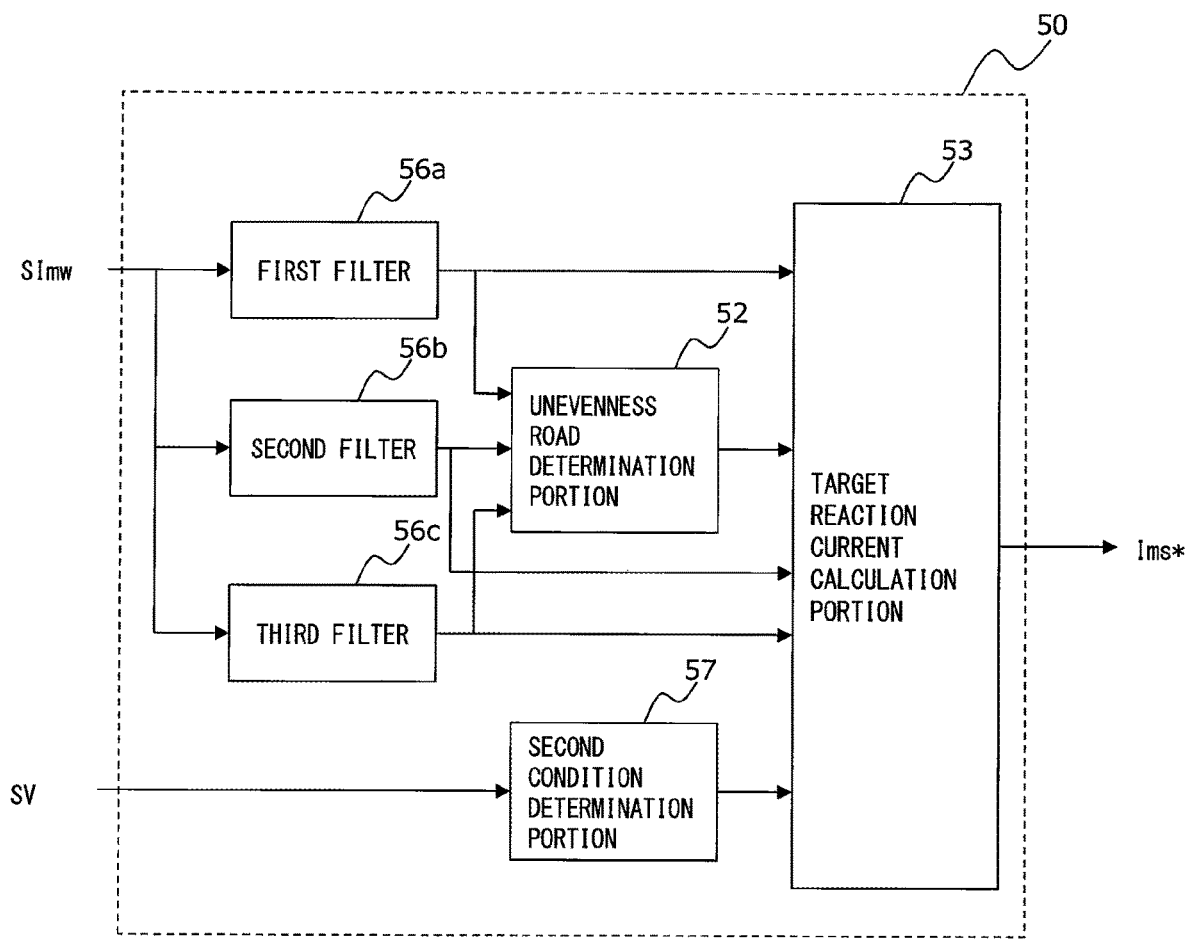
FIG. 7 is a diagram showing a configuration example of the controller to execute the calculation processing of the target reaction current in a third embodiment.

FIG. 7 is a diagram showing a configuration example of the controller 50 to execute the calculation processing of the target reaction current Ims* in the third embodiment. As shown in FIG. 7, the controller 50 includes a first filter 56a, a second filter 56b, a third filter 56c, the unevenness road determination portion 52, the target reaction current calculation portion 53, and a second condition determination portion 57.

In the third embodiment, filters 56a to 56c are set by subdividing the extraction frequency band of the BPF51 (i.e., the frequency band FB_51). In the third embodiment, the occupancy frequency band of a specific filter within the filters 56a to 56c is set to a frequency band of a low-frequency FB-f generated by flutter (flutter). The reason for setting the specific filter is the same as that described in the second embodiment.

The function of the unevenness road determination portion 52 is basically the same as that in the second embodiment. That is, the unevenness road determination portion 52 executes the unevenness road determination processing on the signal SImw that has passed through the first filter 56a (hereinafter, also referred to as "signal SImw_56a"). The unevenness road determination portion 52 also executes the unevenness road determination processing on the signal SImw which has passed through the second filter 56b (hereinafter also referred to as a "signal SImw_56b") and the signal SImw which has passed through the third filter 56c (hereinafter also referred to as a "signal SImw_56c").

The second condition determination portion 57 determines whether or not a second condition is established. The second condition is established when the vehicle is traveling in a predetermined speed range in which flutter is generated. The establishment of the second condition is determined based on, for example, the signal SV.

The target reaction current calculation portion 53 calculates the target reaction current Ims* based on the determination result of the second condition, the result of the unevenness road determination processing, and the signals SImw_56a to SImw_56c. The function of the calculation of the target reaction current Ims* is basically the same as that in the second embodiment described above.

3.2 Effects

According to the third embodiment described above, the determination result of the second condition is additionally considered to the calculation processing of the target reaction current Ims*. Therefore, the signal due to the flutter is removed from the signal SImw (or the output signal from the axial force sensor) during the braking of the vehicle. Therefore, it is possible to suppress the transmission of the vibration generated by the flutter to the driver. Therefore, it is possible to improve the steering feeling in the predetermined speed range in which the flutter is generated.

3.3 Correspondence Relation

The correspondence relation between the third embodiment and the second aspect is as follows. That is, the frequency band FB-f corresponds to the "first frequency band" of the second aspect. The signal passed through the specific filter correspond to the "first signal" of the second aspect. The remaining frequency band of the frequency band FB_51 excluding the frequency band FB-f corresponds to the "second frequency band" of the second aspect. The signal passed through filters other than the specific filter correspond to the "second signal" of the second aspect. The second condition corresponds to the "predetermined condition" of the second aspect.

4. Fourth Embodiment

Next, a fourth embodiment will be described with reference to FIG. 8. In the following description, differences from the first, second or third embodiment will be mainly described, and descriptions overlapping with those in the first, second or third embodiment will be omitted as appropriate.

4.1 Calculation Processing of Target Reaction Current

Figure 8:
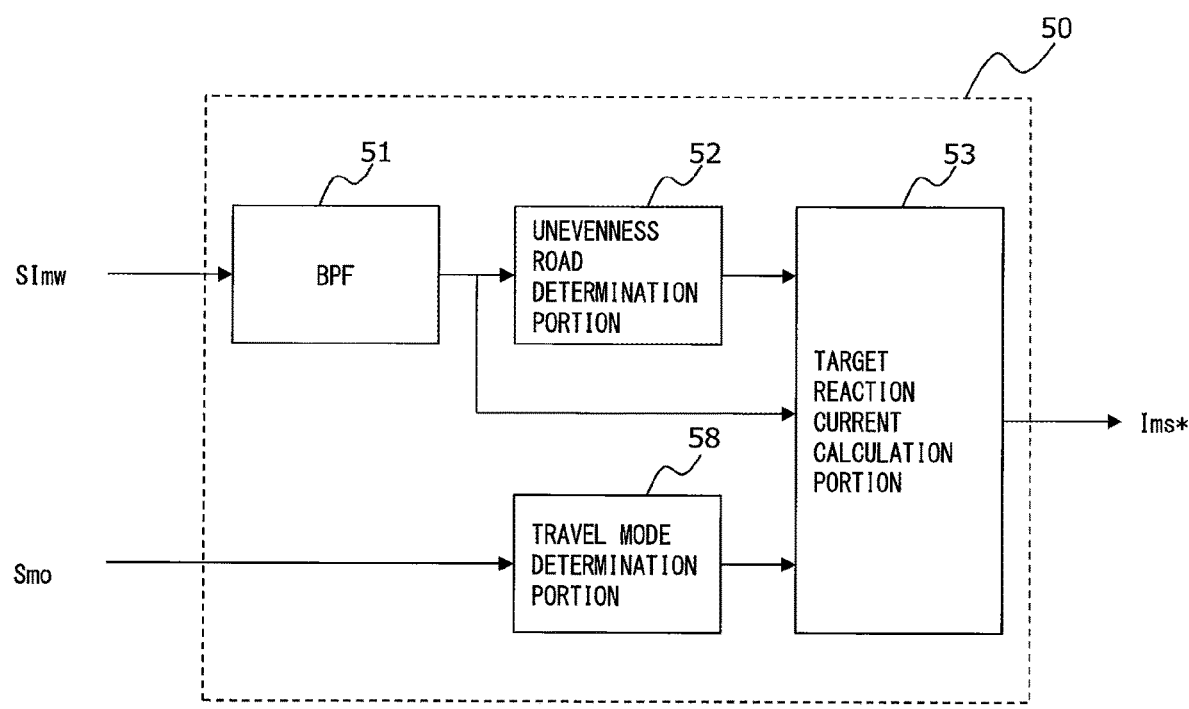
FIG. 8 is a diagram showing a configuration example of the controller to execute the calculation processing of the target reaction current in a fourth embodiment.

FIG. 8 is a diagram showing a configuration example of the controller 50 to execute the calculation processing of the target reaction current Ims* in the fourth embodiment. As shown in FIG. 8, the controller 50 includes the BPF51, the unevenness road determination portion 52, the target reaction current calculation portion 53, and a travel mode determination portion 58. That is, in the configuration example of FIG. 8, the travel mode determination portion 58 is added to the first configuration example of the first embodiment.

In the fourth embodiment, the vehicle control system switches the driving modes of the vehicle based on an instruction from the driver. The vehicle modes include a sport mode and a normal mode (a comfort mode). The sport mode is a driving mode in which grasping performance of road status is emphasized. The normal mode is a driving mode in which travel stability performance is emphasized. The normal mode is also a driving mode in which the grasping performance is more relaxed than the sport mode. The switching of the driving modes is executed by, for example, the manual operation of a selection switch.

The travel mode determination portion 58 determines the driving mode which is currently selected. The traveling mode is determined based on, for example, a signal Smo. The signal Smo is detected by an operation state of the selection switch.

The functions of the BPF51 and the unevenness road determination portion 52 are the same as those in first configuration example.

The target reaction current calculation portion 53 calculates the target reaction current Ims* based on the currently selected driving mode, the result of the unevenness road determination processing, and the signal SImw-51. For example, if it is determined that the sport mode is selected and the road surface is flat, the target reaction current calculation portion 53 multiplies the signal SImw_51 by a gain G7. When it is determined that the sport mode is selected and the road surface includes the bumps and dips, the target reaction current calculation portion 53 multiplies the signal SImw_51 by a gain G8. The gain G7 may be the same value as the gain G8, or may be a different value.

If it is determined that the normal mode is selected and the road surface is flat, the target reaction current calculation portion 53 multiplies the signal SImw_51 by a gain G9. If it is determined that the normal mode is selected and the road surface includes the bumps and dips, the target reaction current calculation portion 53 multiplies the signal SImw_51 by a gain G10. The gain G9 may be the same value as the gain G10, or may be a different value.

Note that the gain G9 is set to a value smaller than the gain G7, and the gain G10 is set to a value smaller than the gain G8. That is, when the normal mode is selected, the signal SImw_51 is multiplied by a gain smaller than that when the sport mode is selected.

4.2 Effects

According to the fourth embodiment described above, when the normal mode is selected, the signal SImw_51 is multiplied by the gain smaller than that when the sport mode is selected. Therefore, it is easy to transmit the vibration generated by the bumps and dips to the driver while traveling in the sport mode, whereas it is difficult to transmit the vibration to the driver while traveling in the normal mode. That is, the vibration generated by the bumps and dips can be actively transmitted to the driver while the vehicle is traveling in the sport mode, whereas the vibration can be not transmitted to the driver at all while the vehicle is traveling in the normal mode.

4.3 Correspondence Relation

The correspondence relation between the fourth embodiment and the fifth aspect is as follows. That is, the sport mode corresponds to the "first travel mode" of the fifth aspect. The normal mode corresponds to the "second travel mode" of the fifth aspect.

What is claimed is:

1. A vehicle control system comprising a steer-by-wire system, wherein the steer-by-wire system comprising:
   a steering device which is configured to turn wheels of a vehicle;
   a reaction force device which is mechanically separated from the steering device and is configured to apply a steering reaction force to a steering wheel; and
   a controller which is configured to control the steering reaction force by drive control of the reaction force device in response to an operation of the steering wheel;
   wherein the controller is further configured to:
   obtain a signal including a component due to a reaction force which acts on the wheels from a road surface;
   extract a signal being greater than or equal to a predetermined frequency from the signal including the component due to the reaction force, the signal equal to or greater than the predetermined frequency includes a first signal which belongs to a first frequency band and a second signal which belongs to a second frequency band corresponding to a remaining frequency band rather than the first frequency band;
   calculate a control amount of the reaction force device based on the extracted signal equal to or greater than the predetermined frequency; and
   determine whether or not a predetermined condition is established, and when it is determined that the predetermined condition is established, weaken the first signal in the calculation processing of the control amount.

2. The vehicle control system according to claim 1, wherein:
   the predetermined condition is that the vehicle is in a braking state; and
   the first frequency band is a frequency band of a low-frequency vibration which is generated during braking of the vehicle.

3. The vehicle control system according to claim 1, wherein:
   the predetermined condition is that the vehicle is traveling in a predetermined speed range; and
   the first frequency band is a frequency band of a low-frequency vibration which is generated by flutter.

4. The vehicle control system according to claim 1, wherein:
   the vehicle is configured to run on a first or a second travel mode; and
   the controller is further configured to calculate the control amount such that a vibration of the steering wheel is greater during a travel with the first travel mode than the travel with the second travel mode.

5. The vehicle control system according to claim 1, wherein the signal equal to or greater than the predetermined frequency includes a signal
   due to bumps and dips on roads.

* * * * *